United States Patent
Jeon et al.

(10) Patent No.: US 7,656,889 B2
(45) Date of Patent: Feb. 2, 2010

(54) IP-BASED VOICE/VIDEO COMMUNICATION SYSTEM AND CALL PICKUP/FORWARDING METHOD

(75) Inventors: Seong-Joon Jeon, Yongin-si (KR); Taek-Ho Kim, Seoul (KR); Mun-Hyo Jung, Gyeongsangnam-do (KR); Soung-Kwan Kim, Gyeonggi-do (KR); Myeon-Kee Youn, Incheon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 851 days.

(21) Appl. No.: 10/987,119

(22) Filed: Nov. 15, 2004

(65) Prior Publication Data

US 2005/0122963 A1  Jun. 9, 2005

(30) Foreign Application Priority Data

Dec. 5, 2003 (KR) .................. 10-2003-0088255

(51) Int. Cl.
    *H04L 12/54* (2006.01)
(52) U.S. Cl. .................. 370/428; 370/352; 379/88.13; 379/93.01; 379/93.11; 379/93.25; 379/211.02
(58) Field of Classification Search ............. 379/88.13, 379/93.01, 93.11, 93.25, 211.02; 370/428, 370/352

See application file for complete search history.

(56) References Cited

U.S. PATENT DOCUMENTS 5,999,525 A * 12/1999 Krishnaswamy et al. .... 370/352

| | | | |
|---|---|---|---|
| 6,950,651 B2 * | 9/2005 | Seligmann | .................. 455/417 |
| 2003/0108176 A1 | 6/2003 | Kung et al. | |
| 2003/0210776 A1 | 11/2003 | Sollee et al. | |
| 2004/0008621 A1 | 1/2004 | Yaker | |
| 2004/0017803 A1 | 1/2004 | Lim et al. | |
| 2004/0028205 A1 | 2/2004 | Lim et al. | |
| 2004/0037272 A1 | 2/2004 | Park | |

(Continued)

FOREIGN PATENT DOCUMENTS

JP           06-062129           3/1994

(Continued)

OTHER PUBLICATIONS

Japanese Office Action issued on Dec. 11, 2007, corresponding to Japanese Patent Application No. 2004-350534.

(Continued)

*Primary Examiner*—Curtis Kuntz
*Assistant Examiner*—Yosef K Laekemariam
(74) *Attorney, Agent, or Firm*—Robert E. Bushnell, Esq.

(57) ABSTRACT

An IP based voice/video communication system and call pickup/forwarding method and a program storage device, readable by a machine, tangibly embodying a program of instructions executable by the machine to perform the call pickup/forwarding method enables a subscriber can have voice/video communication irrespective of time or place by forwarding voice/video calls between voice/video communication terminals such as a TV, PDA and home pad, or by picking up a incoming call at a nearby terminal if it is difficult for the subscriber to answer the call at the originally called terminal from his/her location.

21 Claims, 10 Drawing Sheets

U.S. PATENT DOCUMENTS

2004/0042607 A1    3/2004    Gallant et al.
2004/0076140 A1    4/2004    Begeja et al.

FOREIGN PATENT DOCUMENTS

| | | |
|---|---|---|
| JP | 07-254928 | 10/1995 |
| JP | 10-145500 | 5/1998 |
| JP | 11-504191 | 4/1999 |
| JP | 2001-274908 | 10/2001 |
| JP | 2003-324482 | 11/2003 |
| WO | 02/103964 | 12/2002 |

OTHER PUBLICATIONS

Japanese Decision of Grant issued on Jul. 22, 2008 on the corresponding Japanese Patent Application No. 2004-350534.

* cited by examiner

FIG. 2

| MESSAGE TYPE | IP ADD | PORT # | IP ADD | PORT # | SERVICE TYPE |
|---|---|---|---|---|---|
| 0-9: Reserved<br>10: Call Pick up Request<br>11: Call Transfer Request<br>20: Call Pick up Confirm<br>21: Call Transfer Confirm<br>32: Distribute Not Deny | IP ADDRESS OF FORWARDING TERMINAL | RTP PORT # OF FORWARDING TERMINAL | IP ADDRESS OF FORWARDING DESTINATION TERMINAL | RTP PORT # OF FORWARDING DESTINATION TERMINAL | 0: Both<br>1: Video only<br>2: Audio only |

FIG. 3

| GATEWAY PORT # | TERMINAL ADDRESS | TERMINAL PORT # | PORT # OF FORWARDING DESTINATION TERMINAL |
|---|---|---|---|
| 8110 (END # OF TERMINAL ADDRESS * 10) | 192.168.82.11 | 8000 | 8130 |
| 8120 (END # OF TERMINAL ADDRESS * 10) | 192.168.82.12 | 8000 | 0000 |
| 8130 (END # OF TERMINAL ADDRESS * 10) | 192.168.82.13 | 8000 | 0000 |
| | | | |

FIG. 4

| TERMINAL ADDRESS | PORT # | TERMINAL ADDRESS | SERVICE TYPE |
|---|---|---|---|
| 192.168.82.100 | 8000 | 192.168.82.200 | 2 (Video) |
| 192.168.82.100 | 8000 | 192.168.82.200 | 1 (Voice) |
| 192.168.82.100 | 8000 | 192.168.82.200 | 0 (Both) |

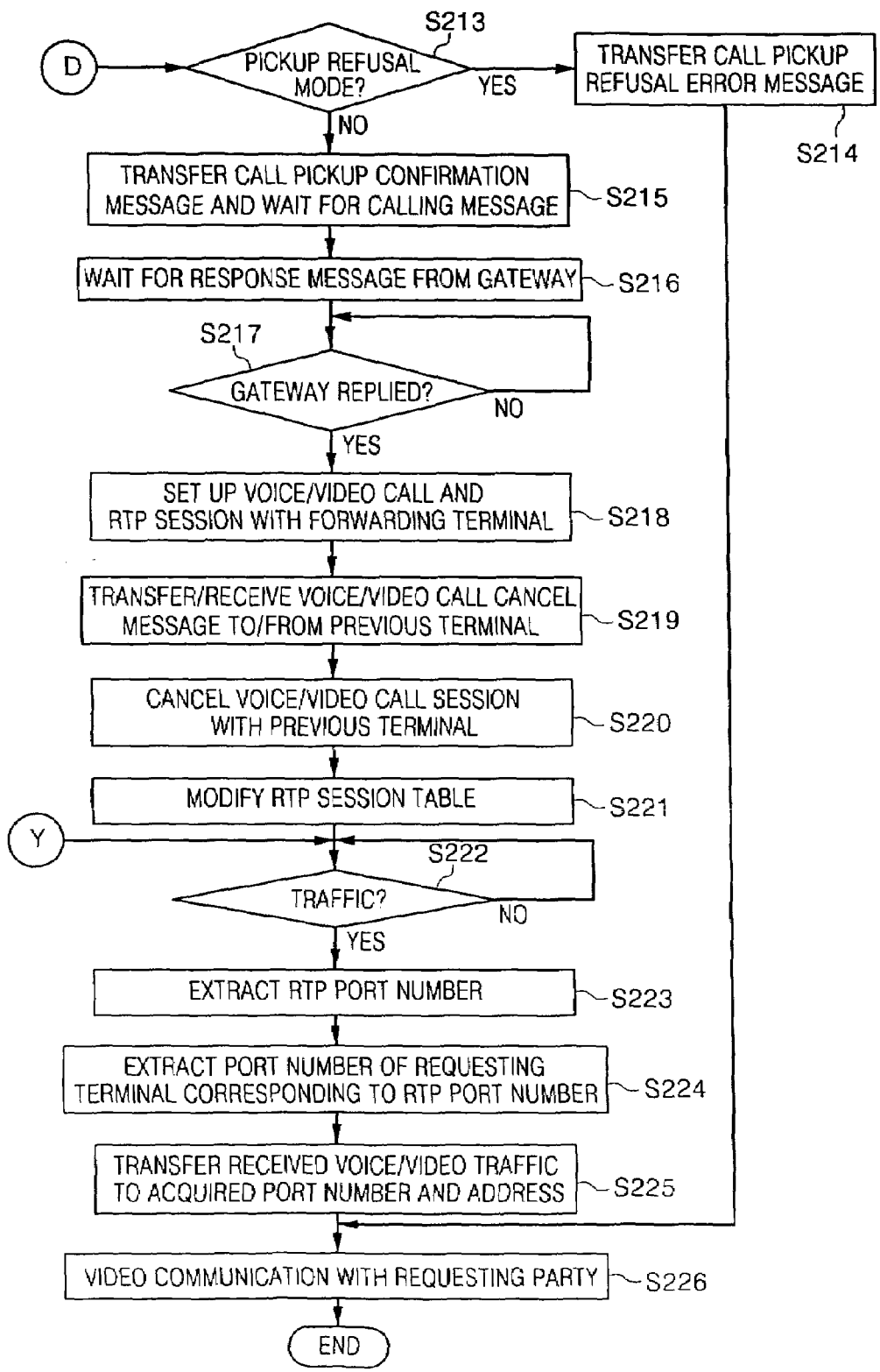

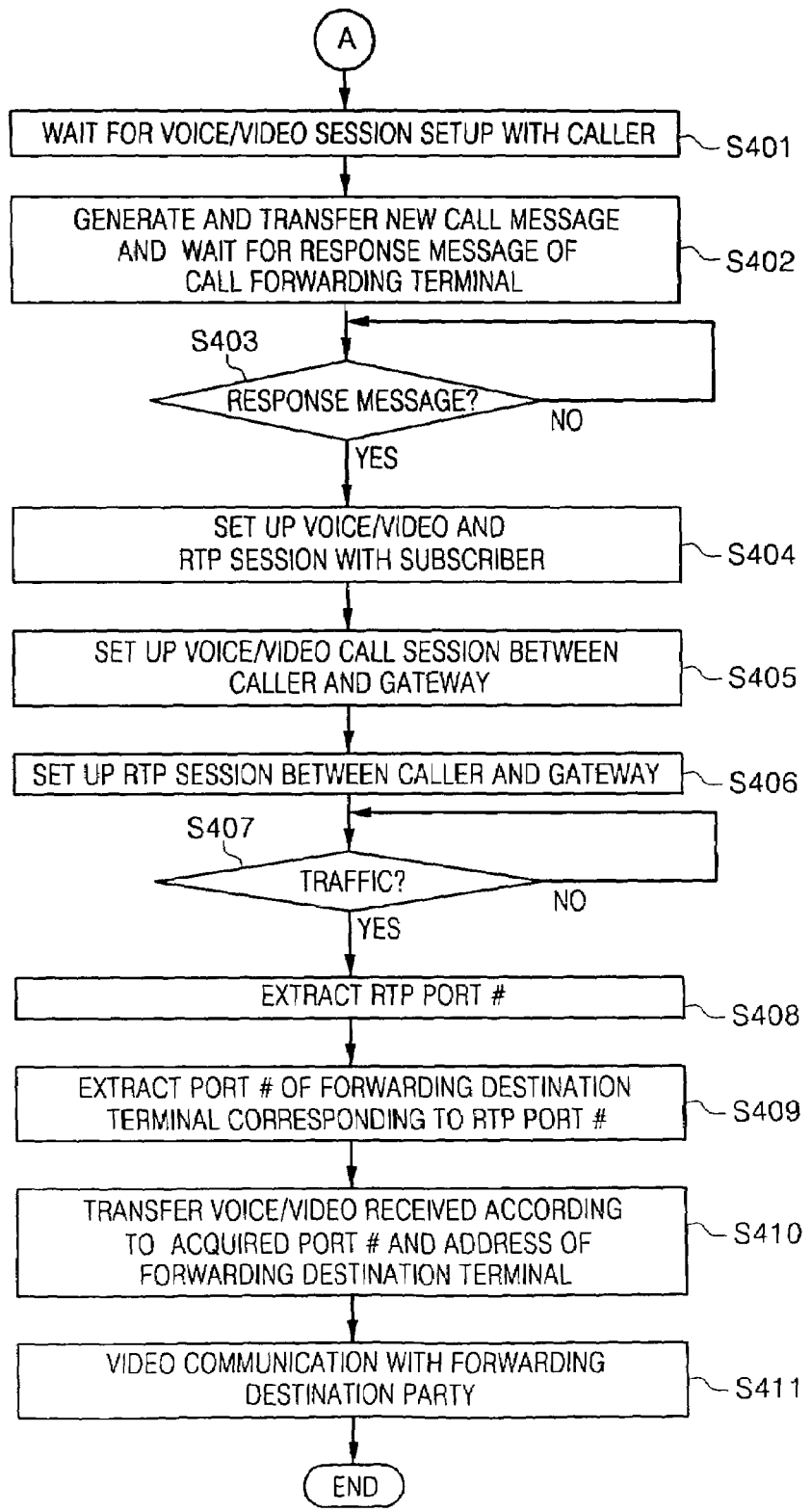

IP-BASED VOICE/VIDEO COMMUNICATION SYSTEM AND CALL PICKUP/FORWARDING METHOD

CLAIM OF PRIORITY

This application makes reference to, incorporates the same herein, and claims all benefits accruing under 35 U.S.C. § 119 from an application for IP-BASED VOICE/VIDEO COMMUNICATION SYSTEM AND CALL FORWARDING/PICKUP METHOD USING THE SAME earlier filed in the Korean Intellectual Property Office on Dec. 5, 2003 and there duly assigned Ser. No. 2003-88255.

BACKGROUND OF THE INVENTION

1. Field of the Invention

The present invention relates to an Internet Protocol (IP) based voice/video communication system and a call pickup/forwarding method. More particularly, the present invention relates to an IP based voice/video communication system and a call pickup/forwarding method by which a voice/video incoming call received in a first terminal can be picked up by a second terminal and/or a call forwarding mode of the incoming call can be set to automatically forward an incoming call received in the first terminal to second terminal. In addition, the present invention also relates to a program storage device, readable by a machine, tangibly embodying a program of instructions executable by the machine to perform the call pickup/forwarding method.

2. Description of the Related Art

In general, Internet-phone services are used to provide voice communication by using a worldwide communication infrastructure, that is, the Internet instead of a conventional Public Switched Telephone Network (PSTN). The conventional PSTN as a circuit switching network performs static switching while providing a fixed bandwidth of 64 Kbps to guarantee communication quality. However, the Internet, as a packet switching network, performs dynamic routing to provide best-effort services, thereby rarely guaranteeing communication quality. Nevertheless, Internet phones are getting more widely used since they can provide inexpensive long distance calls as well as create various forms of services.

The Internet-phone services can be classified into PC-to-PC, PC-to-Phone, Phone-to-PC and Phone-to-Phone services. In the PC-to-PC service, two users who want to communicate with each other use their multimedia computers as Internet-phone terminals. The computers can be connected to each other on a Local Area Network (LAN), or connected to telephone lines via modems to use the Internet via an Internet Service Provider (ISP). A voice signal is sampled, compressed and packeted in a codec with software of a transmitting PC, and a received voice signal is regenerated by a sound card in a receiving PC.

In the PC-to-Phone service, a PC is first connected to an Internet-phone gateway and then a telephone number of a counterpart to call is inputted to the gateway so that the gateway interprets it to connect the PC to a counterpart telephone via a conventional PSTN.

In the Phone-to-PC service, a subscriber of a conventional PSTN connects to an Internet-phone gateway and provides the information of a counterpart to call so that the Internet-phone gateway allows the subscriber to communicate with a corresponding PC via the Internet.

The Phone-to-Phone service allows communication between conventional telephones via the Internet. In the Phone-to-Phone service, a user connects to a nearby gateway using a public telephone connected to a PSTN, and then inputs a counterpart telephone number after user authentication and caller identification for charge. Then, a calling gateway packets the counterpart telephone number and sends it to a gateway nearest to a receiving part. The receiving part gateway converts the packet into the telephone number again to call the counterpart via the PSTN. Upon establishment of the connection setup between the two users, voice data is coded in a gateway and transmitted via the Internet, and a counterpart gateway decodes the coded voice data into a voice signal that is sent to the counterpart via the PSTN.

Further, the IP-based voice/video telephone is being developing in various forms in both the office and home automation environment. In particular, the recent office and home environment mainly utilizes a private system using an Access Point (AP) such as a wireless LAN communication arrangement, which allows voice/video communication to be performed via a personal terminal, (for example, a PDA, a digital TV and a home pad).

However, because the voice/video communication can be performed only between a calling terminal and a receiving terminal, there is a problem in that mobility is not guaranteed but rather depends upon the position of the receiving terminal, in particular, when the receiving terminal is located in a home.

For example, if a call signal is received in a terminal in a bedroom when a subscriber is working in a living room, the subscriber must go to the bedroom to answer the call with a corresponding voice/video terminal (for example, a TV). When the subscriber wants to perform communication via a home pad on a refrigerator in the kitchen instead of the TV during communication, because call forwarding is not enabled, the subscriber must continue conversation via the TV or asks a caller to call again to the refrigerator home pad. This can be an annoyance or inconvenience to the user.

Furthermore, because the subscriber cannot pick up a incoming call with a terminal at hand to answer the call if the call is received by a remotely located terminal, there is a problem in that the mobility of the subscriber is not guaranteed.

The following patents each discloses features in common with the present invention but do not teach or suggest the inventive features specifically recited in the present application: U.S. Patent Application No. 2004/0028205 to Lim et al., entitled METHOD FOR PERFORMING EXTERNAL CALL FORWARDING BETWEEN INTERNET AND TELEPHONE NETWORK IN WEB-PHONE SYSTEM, published on Feb. 12, 2004; U.S. Patent Application No. 2003/0108176 to Kung et al., entitled PERSONAL IP FOLLOW-ME SERVICE, published on Jun. 12, 2003; U.S. Patent Application No. 2003/0210776 to Sollee et al., entitled METHOD AND APPARATUS FOR PROVIDING ADVANCED IP TELEPHONY SERVICES IN AN INTELLIGENT ENDPOINT, published on Nov. 13, 2003; U.S. Patent Application No. 2004/0008621 to Yaker, entitled SYSTEM AND METHOD FOR PROVIDING ADVANCED CALLING FEATURES TO A PACKET NETWORK-BASED COMMUNICATION DEVICE AND PACKET NETWORK EMPLOYING THE SAME, published on Jan. 15, 2004; U.S. Patent Application No. 2004/0017803 to Lim et al., entitled CALL FORWARDING METHOD, published on Jan. 29, 2004; U.S. Patent Application No. 2004/0028205 to Lim et al., entitled METHOD FOR PERFORMING EXTERNAL CALL FORWARDING BETWEEN INTERNET AND TELEPHONE NETWORK IN WEB-PHONE SYSTEM, published on Feb. 12, 2004; U.S. Patent Application No. 2004/0037272 to Park, entitled METHOD OF FORWARDING PACKET CALLS IN MOBILE COMMUNICA- TION SYSTEM, published on Feb. 26, 2004; U.S. Patent Application No. 2004/0042607 to Gallant et al., entitled METHOD OF AND SYSTEM FOR PROVIDING INTELLIGENT NETWORK CONTROL SERVICES IN IP TELEPHONY, published on Mar. 4, 2004; and U.S. Patent Application No. 2004/0076140 to Begeja et al., entitled METHOD AND SYSTEM FOR REMOTE CALL FORWARDING OF TELEPHONE CALLS FROM AN IP CONNECTION, published on Apr. 22, 2004.

SUMMARY OF THE INVENTION

It is, therefore, an object of the present invention to provide an IP based voice/video communication system and a call pickup/forwarding method, by which if a new incoming call is received by a first voice/video terminal during video communication via the first terminal, an off-hook call or the incoming call is picked up from the first terminal by a second terminal in response to the selection of a specific button on the second terminal so that a user can have voice/video communication with a caller via the second terminal, which picked up the call.

The present invention can also guarantee the mobility of a user through a call forwarding setup to a specific terminal, by which when the user moves through a living room, bedroom or kitchen or works at the office, a incoming call received by any terminal can be transmitted to the specific terminal so that the user can answer the call via the specific terminal.

According to an aspect of the present invention for realizing the above objects, a call pickup/forwarding method is provided comprising: determining whether a first terminal is in voice/video communication with a second terminal upon receiving a call signal for call setup to the second terminal from the first terminal via a first network and upon receiving a request signal for pickup of a call received to the second terminal from a third terminal; setting a call session with each of the first and third terminals and registering a call pickup information of the third terminal in a call pickup table upon a determination that the first terminal is not in voice/video communication with the second terminal; setting a call session with the third terminal which made the call pickup request, canceling a call session with the second terminal in voice/video communication, and then registering the call pickup information of the third terminal in the call pickup table upon a determination that the first terminal is in voice/video communication with the second terminals; and transmitting received voice/video traffic to the third terminal which made the call pickup request via a second network based upon the call pickup information registered in the call pickup table upon receiving voice/video traffic from the first terminal via the first network.

Preferably, the first network comprises an Internet Protocol (IP) network, and the second network comprises a Wireless Local Area Network (WLAN).

Preferably, each of the terminals comprises at least one terminal selected from a group including a TV, a Personal Digital Assistant (PDA) and a home pad, each of which can perform video and voice communication via the first and second networks.

Preferably, the call pickup table comprises: a first field adapted to store a port number of at least one terminal registered in a gateway or Access Point (AP); a second field adapted to store an IP address of at least one terminal registered in the AP; a third field adapted to store a port number of each terminal; and a fourth field adapted to store port number information of the terminal which made the call pickup request.

Preferably, the port number information of the terminal which made the call pickup request registered in the fourth field corresponds to at least one port number of gateways stored in the first field, and wherein a call is forwarded to an IP address corresponding to the gateway port number corresponding to the port number information stored in the fourth field upon the port number of the terminal which made the call pickup request being registered in the fourth field.

Preferably, transmitting received voice/video traffic to the third terminal comprises: extracting Real-time Transport Protocol (RTP) port number information from the received voice/video traffic upon receiving voice/video traffic to be transmitted to the second terminal via the first network from the first terminal; acquiring a port number and IP address information of the third terminal which made the call pickup request corresponding to the extracted RTP port number; and transmitting the received voice/video traffic to the third terminal via the second network using the port number and IP address information of the third terminal which made the call pickup request.

Preferably, the method further comprises transmitting a call pickup refusal error message to the third terminal via the second network upon a call pickup refusal mode being set with respect to the third terminal during the voice/video communication between the first and second terminals.

According to another aspect of the present invention for realizing the above objects, a call pickup/forwarding method is provided comprising: registering call forwarding information of a first terminal which requested a call forwarding setup and a second terminal to be call forwarded in a call forwarding table upon receiving a voice/video call forwarding mode setup request message to the second terminal from the first terminal via a first network; setting up a call session with the second terminal upon incoming voice/video traffic being received from a third terminal via a second network; and transmitting the received voice/video traffic to the second terminal via the second network using the call forwarding information registered in the call forwarding table upon voice/video traffic being received from the third terminal.

Preferably, the first network comprises a WLAN, and the second network comprises an IP network.

Preferably, each of the terminals comprises at least one terminal selected from a group including a TV, a PDA and a home pad, each of which can perform video and voice communication via the first and second networks.

Preferably, the call forwarding information stored in the call forwarding table comprises at least one piece of information selected from a group including IP address information of the terminal which requested the call forwarding, and an IP address and port number information of service which will be provided between the terminals.

Preferably, the method further comprises transmitting a call forwarding mode cancel message to the second terminal via the first network, and then canceling the call forwarding information registered in the call forwarding table upon a call forwarding cancel request message being received from the first terminal during the setup of the call forwarding mode from the first terminal to the second terminal.

Preferably, transmitting received voice/video traffic to the third terminal comprises: extracting RTP port number information from the received voice/video traffic upon receiving voice/video traffic to be transmitted to the second terminal via the first network from the third terminal; acquiring a port number and IP address information of the third terminal which made the call pickup request corresponding to the extracted RTP port number; and transmitting the received voice/video traffic to the second terminal via the first network using the port number and IP address information of the third terminal which made the call pickup request.

According to yet another aspect of the present invention for realizing the above objects, a call pickup/forwarding system is provided comprising: a judgment unit adapted to determine whether a first terminal is in voice/video communication with a second terminal upon receiving an incoming signal for call setup to the second terminal from the first terminal via a first network and upon receiving a request signal for the pickup of a call received in the second terminal from the third terminal; a storage unit adapted to store call pickup information upon a call pickup request from the third terminal; a session setup unit adapted to set up call sessions with the first terminal and the third terminal and to store call pickup information of the third terminal in the storage unit upon a determination that the first terminal is not in voice/video communication with the second terminal, and adapted to set up a call session with the third terminal which made the call pickup request canceling the call session with the second terminal which is in voice/video communication with the first terminal, and then to store call pickup information of the third terminal in the storage unit; and a call pickup processing unit adapted to transmit received voice/video traffic to the third terminal which made the call pickup request via a second network using the call pickup information stored in the storage unit upon receiving voice/video traffic via the first network from the first terminal according to the call session setup of the session setup unit.

Preferably, the storage unit comprises: a first field adapted to store a port number of at least one terminal registered in a gateway or AP; a second field adapted to store an IP address of at least one terminal registered in the AP; a third field adapted to store a port number of each terminal; and a fourth field adapted to store port number information of the terminal which made the call pickup request.

Preferably, the call pickup processing unit comprises: an extraction unit adapted to extract RTP port number information from the voice/video traffic to be transmitted to the second terminal, and adapted to extract a port number and IP address information of the third terminal which made the call pickup request corresponding to the extracted RTP port number; and a transmit unit adapted to transmit the received voice/video traffic to the third terminal via the second network using the port number and IP address information of the third terminal which made the call pickup request.

According to still another aspect of the present invention for realizing the above objects, a call pickup/forwarding system is provided comprising: a storage unit adapted to store call forwarding information of terminals for forwarding received voice/video calls; a call forwarding mode setup unit adapted to register call forwarding information of a first terminal and a second terminal in the storage unit to set up a call forwarding mode upon receiving a voice/video call forwarding mode setup request message to the second terminal from the first terminal via a first network; a call session setup unit adapted to set up a call session with the second terminal to be call forwarded upon receiving an incoming signal from a third terminal via a second network; and a call forwarding processing unit adapted to transmit voice/video traffic to the second terminal via the second network using the call forwarding information of the second terminal registered in the storage unit upon receiving the voice/video traffic from the third terminal.

Preferably, the first network comprises a WLAN, and the second network comprises an IP network.

Preferably, the call forwarding information stored in the storage unit comprises at least one piece of information selected from a group including an IP address and port number information of the terminal which made a call forwarding request, and an IP address and port number information of the second terminal and service type information of services which will be provided between the terminals.

Preferably, the call forwarding mode setup unit is adapted to transmit a call forwarding mode cancel message to the second terminal via the first network, and to then cancel the call forwarding information registered in the storage unit upon receiving a call forwarding cancel request message from the first terminal at the setup of the call forwarding mode from the first terminal to the second terminal.

Preferably, the call forwarding processing unit comprises: an extraction unit adapted to extract RTP port number information from the voice/video traffic to be transmitted to the first terminal and adapted to extract a port number and IP address information of the second terminal corresponding to the extracted RTP port number; and a transmit unit adapted to transmit the received voice/video traffic to the second terminal via the first network using the port number and IP address information of the second terminal which made the call forwarding request.

According to still another aspect of the present invention for realizing the above objects, a program storage device, readable by a machine, tangibly embodying a program of instructions executable by the machine to perform a call pickup/forwarding method is provided, the method comprising: determining whether a first terminal is in voice/video communication with a second terminal upon receiving a call signal for call setup to the second terminal from the first terminal via a first network and upon receiving a request signal for pickup of a call received to the second terminal from a third terminal; setting a call session with each of the first and third terminals and registering a call pickup information of the third terminal in a call pickup table upon a determination that the first terminal is not in voice/video communication with the second terminal; setting a call session with the third terminal which made the call pickup request, canceling a call session with the second terminal in voice/video communication, and then registering the call pickup information of the third terminal in the call pickup table upon a determination that the first terminal is in voice/video communication with the second terminals; and transmitting received voice/video traffic to the third terminal which made the call pickup request via a second network based upon the call pickup information registered in the call pickup table upon receiving voice/video traffic from the first terminal via the first network.

Preferably, the first network comprises an Internet Protocol (IP) network, and the second network comprises a Wireless Local Area Network (WLAN).

Preferably, each of the terminals comprises at least one terminal selected from a group including a TV, a Personal Digital Assistant (PDA) and a home pad, each of which can perform video and voice communication via the first and second networks.

Preferably, the call pickup table comprises: a first field adapted to store a port number of at least one terminal registered in a gateway or Access Point (AP); a second field adapted to store an IP address of at least one terminal registered in the AP; a third field adapted to store a port number of each terminal; and a fourth field adapted to store port number information of the terminal which made the call pickup request.

Preferably, the port number information of the terminal which made the call pickup request registered in the fourth field corresponds to at least one port number of gateways stored in the first field, and wherein a call is forwarded to an IP address corresponding to the gateway port number corresponding to the port number information stored in the fourth field upon the port number of the terminal which made the call pickup request being registered in the fourth field.

Preferably, transmitting received voice/video traffic to the third terminal comprises: extracting Real-time Transport Protocol (RTP) port number information from the received voice/video traffic upon receiving voice/video traffic to be transmitted to the second terminal via the first network from the first terminal; acquiring a port number and IP address information of the third terminal which made the call pickup request corresponding to the extracted RTP port number; and transmitting the received voice/video traffic to the third terminal via the second network using the port number and IP address information of the third terminal which made the call pickup request.

Preferably, the program storage device further comprises transmitting a call pickup refusal error message to the third terminal via the second network upon a call pickup refusal mode being set with respect to the third terminal during the voice/video communication between the first and second terminals.

According to still another aspect of the present invention for realizing the above objects, a program storage device, readable by a machine, tangibly embodying a program of instructions executable by the machine to perform a call pickup/forwarding method is provided, the method comprising:

registering call forwarding information of a first terminal which requested a call forwarding setup and a second terminal to be call forwarded in a call forwarding table upon receiving a voice/video call forwarding mode setup request message to the second terminal from the first terminal via a first network;

setting up a call session with the second terminal upon incoming voice/video traffic being received from a third terminal via a second network; and transmitting the received voice/video traffic to the second terminal via the second network using the call forwarding information registered in the call forwarding table upon voice/video traffic being received from the third terminal.

Preferably, the first network comprises a WLAN, and the second network comprises an IP network.

Preferably, each of the terminals comprises at least one terminal selected from a group including a TV, a PDA and a home pad, each of which can perform video and voice communication via the first and second networks.

Preferably, the call forwarding information stored in the call forwarding table comprises at least one piece of information selected from a group including IP address information of the terminal which requested the call forwarding, and an IP address and port number information of service which will be provided between the terminals.

Preferably, the program storage device further comprises transmitting a call forwarding mode cancel message to the second terminal via the first network, and then canceling the call forwarding information registered in the call forwarding table upon a call forwarding cancel request message being received from the first terminal during the setup of the call forwarding mode from the first terminal to the second terminal.

Preferably, transmitting received voice/video traffic to the third terminal comprises: extracting RTP port number information from the received voice/video traffic upon receiving voice/video traffic to be transmitted to the second terminal via the first network from the third terminal; acquiring a port number and IP address information of the third terminal which made the call pickup request corresponding to the extracted RTP port number; and transmitting the received voice/video traffic to the second terminal via the first network using the port number and IP address information of the third terminal which made the call pickup request.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein;

FIG. 2 is a view of a table structure defining a message used for call pickup/forwarding according to an embodiment of the present invention;

FIG. 3 is a view of an RTP session table used in call pickup/forwarding according to an embodiment of the present invention;

FIG. 4 is a view of a call forwarding table used in call forwarding according to an embodiment of the present invention;

FIGS. 6A and 6B are flowcharts of IP-based voice/video call pickup/forwarding processes according to an embodiment of the present invention; and FIGS. 7A and 7B are flowcharts of IP-based voice/video call forwarding processes according to an embodiment of the present invention.

DETAILED DESCRIPTION OF THE EMBODIMENTS

Hereinafter an IP-based voice/video communication system and a call pickup/forwarding method according to the present invention will be described in detail with reference to the accompanying drawings.

Figure 1:
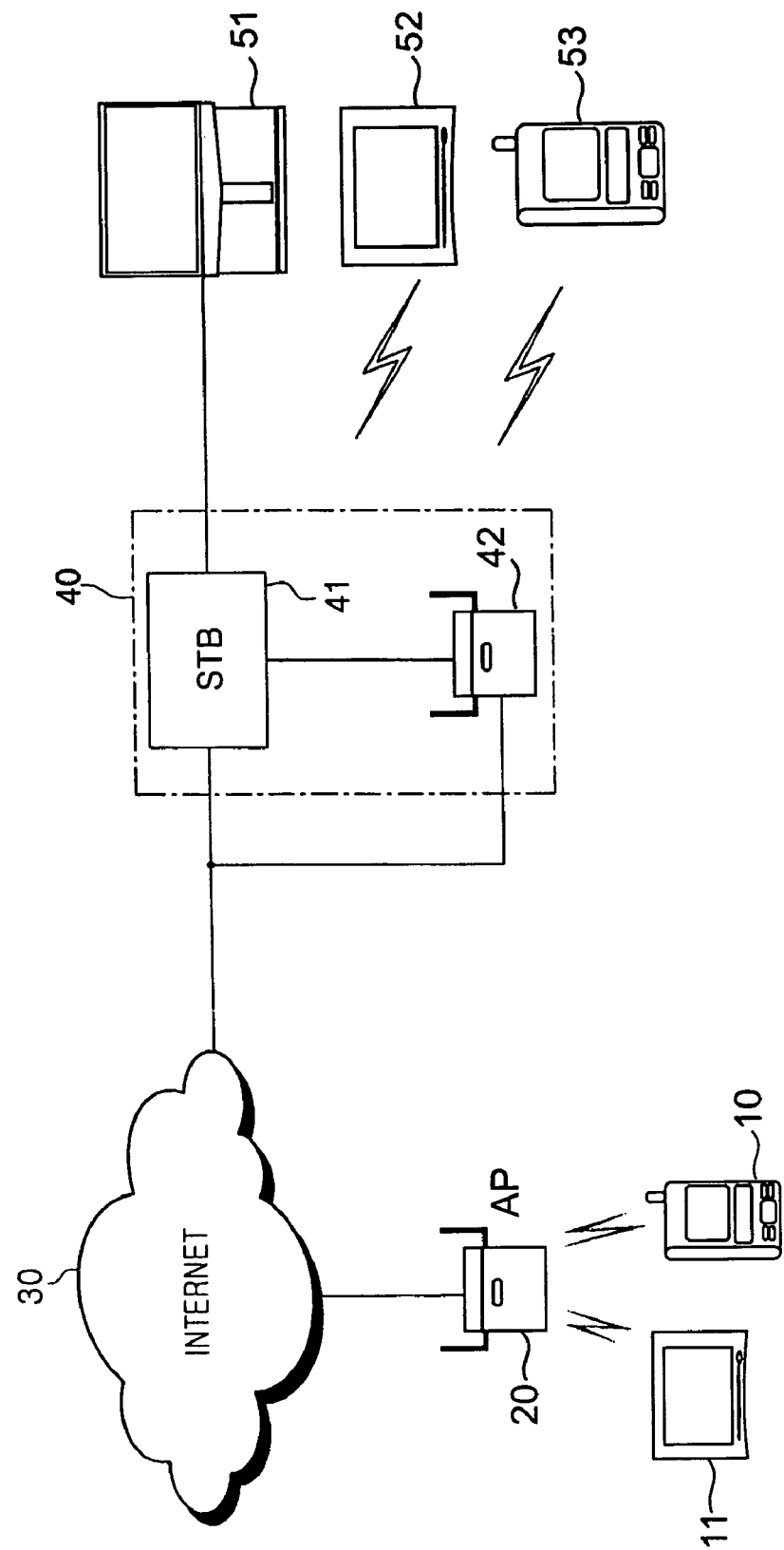
FIG. 1 is a view of a network structure of an IP-based voice/video communication system capable of executing call pickup/forwarding according to an embodiment of the present invention.

FIG. 1 is a view of a network structure of an IP-based voice/video communication system capable of executing call pickup/forwarding according to an embodiment of the present invention.

As shown in FIG. 1, a home gateway 40 consists of a set top box 41 and an Access Point (AP) 42, in which the set top box 41 is connected to a TV via a cable and the AP 42 is coupled to a home pad 52 and a PDA 53, which have communication functions, via a WLAN.

In an office environment, a home pad 11 and a PDA 10 are connected to an AP 20 via the WLAN so that the home pad 11 and the PDA 10 are connected to each other via the AP 20 having a proxy function to execute video or voice communication.

The home gateway 40 can be coupled to the AP 20 in the office environment via an IP network (e.g., the Internet) 30.

The afore-described terminals including the PDA 10, the home pad 11, the TV 51, the home pad 52 and the PDA 53 can have call forwarding and call pickup keys for effecting call forwarding setup and/or call pickup requests to the APs 20 and 42 according to an embodiment of the present invention.

Before describing an operation of the IP-based voice/video communication system capable of executing call pickup/forwarding according to an embodiment of the present invention, a message used for the call pickup/forwarding operation, an RTP session table and a call forwarding table will be first explained with reference to FIGS. 2 to 4.

FIG. 2 is a view of a table structure defining a message used in call pickup/forwarding according to an embodiment of the present invention, FIG. 3 is a view of an RTP session table used in call pickup/forwarding according to an embodiment of the present invention, and FIG. 4 is a view of a call forwarding table used in call forwarding according to an embodiment of the present invention.

As shown in FIG. 2, the message used in call pickup/forwarding according to an embodiment of the present invention can include message types, the IP address of a first terminal which makes a call pickup/forwarding request (which hereinafter will be referred to as a "call forwarding terminal" or "forwarding terminal"), the RTP port number of the forwarding terminal, the IP address of a second terminal to which calls will be picked up and/or forwarded (which hereinafter will be referred to as a "call forwarding destination terminal" or "forwarding destination terminal"), the RTP port number of the forwarding destination terminal and service types.

The message types can include a call pickup request message, a call forwarding request message, a call pickup confirmation message, a call forwarding confirmation message and a call refusal message (e.g., a distribute not deny message). The service types are classified into video service, voice service and both (voice/video) service to indicate the traffic type that is being served at present via the RTP.

The RTP session table shown in FIG. 3 is necessary for the RTP session management and reset of voice/video terminals, and contains gateway or AP 42 port numbers, terminal addresses, terminal port numbers and forwarding destination terminal port numbers.

The gateway port number is the port number of traffic flowing into the gateway 42. The traffic flowing via this port number is forwarded to a forwarding terminal, replaced with the terminal address of a first adjacent field and the terminal port number of a second adjacent field.

In this case, any port number existing in the last field, that is, the port number information field of a forwarding destination terminal shown in FIG. 3 indicates that a call pickup function is set. The gateway port numbers are retrieved according to the port number indicated by the last field, and any port number identical with the last field port number is replaced with the terminal address and the terminal port number of its second and third fields so that corresponding traffic is sent to a corresponding terminal, that is, the final terminal which performs the call pickup function. This is applied to a call forwarding function in the same way to convert input traffic to the call forwarding destination terminal.

FIG. 4 is a view of a call forwarding table used in call forwarding according to an embodiment of the present invention, in which a forwarding destination terminal is registered in the table of a forwarding terminal so that the forwarding terminal, upon receiving a call, can forward the traffic to the forwarding destination terminal through the RTP session table operation.

Information stored in the call forwarding table can include addresses of forwarding terminals, port numbers of the forwarding terminals, addresses of forwarding destination terminals, port numbers of forwarding destination terminals and service types provided to corresponding terminals.

Hereinafter, the call pickup/forwarding operation of the IP-based voice/video communication system according to an embodiment of the present invention, as shown in FIG. 1, will be described in brief.

First, a caller transmits a call signal for video communication with a calling terminal, for example, the PDA 10 shown in FIG. 1, to the AP 20, which in turn transmits the received call signal to the home gateway 40 via the Internet 30.

The AP 42 of the home gateway 40 transmits the call signal to a terminal according to its address and port number contained in the call signal.

If there is a Hang-on signal from the called terminal, the gateway 40 sets up voice/video call and RTP sessions with the calling terminal so that voice/video communication can be established via the set sessions.

If a user or a called party requests call transmit, for example, a subscriber of the AP 42 of the gateway 40 requests calls received in the home pad 52 to be transmitted to the PDA 53, a call transmit request message as shown in FIG. 2 is transmitted to the AP 42, which in turn registers call forwarding information in the call forwarding table shown in FIG. 4 in response to the call forwarding request message from the home pad 52.

As an operation in response to the call forwarding request message is executed, the AP 42 forwards calls and voice/video data received in the private address of the home pad 52 to the private address of the call-forwarding registered PDA 53 via a wireless LAN. The call forwarding information registered in the call forwarding table can include addresses and port numbers of call-forwarding terminals and addresses and port numbers of call-forwarding destination terminals.

During the video communication with the PDA 53, if the subscriber of the AP 42 selects a call pickup key (not shown) of the home pad 52 to perform the video communication with the home pad 52, the home pad 52 transmits a call pickup request message as shown in FIG. 2 to the AP 42.

Upon receiving the call pickup request message from the home pad 52, the AP 42 corrects the RTP session table before forwarding received calls and voice/video data to the home pad 52 which requested call pickup.

The call controlling method in accordance with an embodiment of the present invention with respect to the home gateway 40 shown in FIG. 1 will be described first with reference to the flowcharts shown in FIGS. 5A and 5B.

Figure 5A:
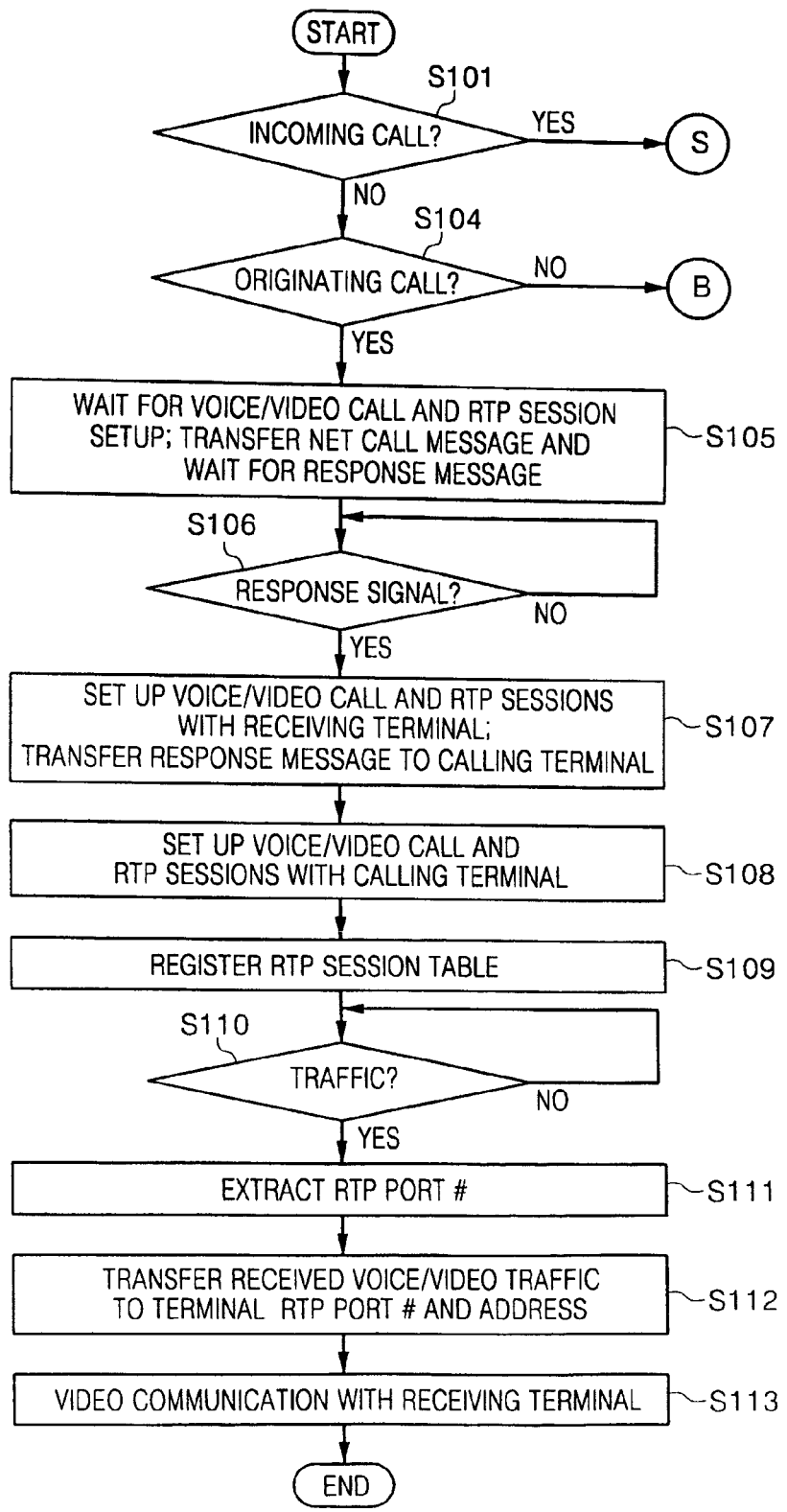
FIGS. 5A and 5B are flowcharts of call controlling processes in the home gateway shown in FIG. 1.
Figure 5B:
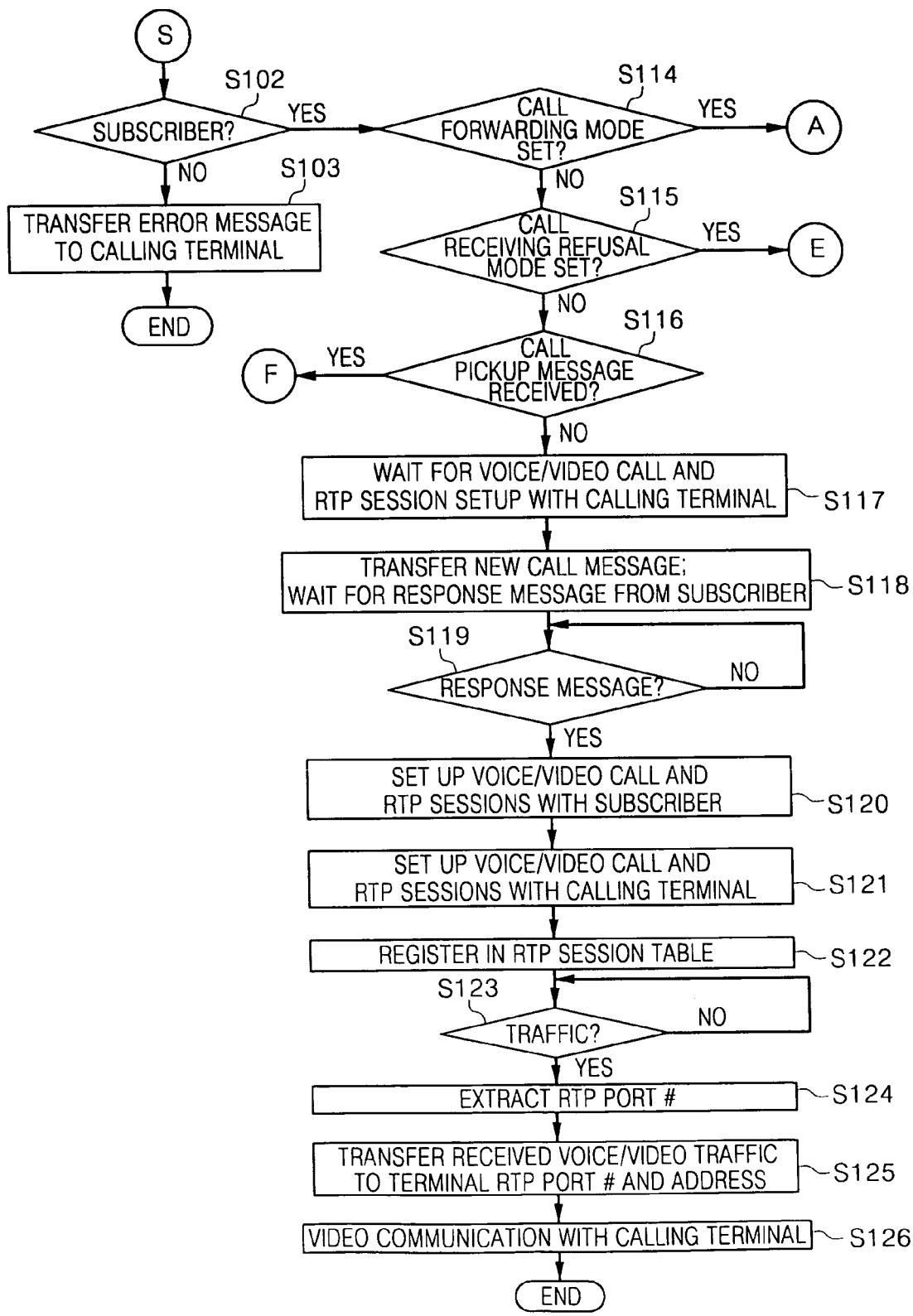

FIGS. 5A and 5B are flowcharts of call controlling processes in the home gateway 40 shown in FIG. 1.

As shown in FIG. 5A, if a call signal is received by the AP 41 of the gateway 40, the gateway 40 determines whether the received call is an incoming call from the AP 20 via the Internet 30 or an originating call from one of the terminals 51, 52 and 53 in S101 and S104.

If it is determined that the received call is not an incoming call but an originating call from, for example, the PDA 53, the gateway 40 waits for a voice/video call and RTP session setup with the PDA 53, and generates and transmits a new call message to the AP 20 in which the counterpart terminal or the PDA 53 is registered via the Internet 30 in S105. Then, the AP 20 transmits a corresponding new call message to the PDA 10 as a receiving terminal, and then waits for a response signal from the PDA 10.

A determination is made as to whether the PDA 10 originated a response signal or a hang-on signal in S106. If the PDA 10 originated the response signal, then the AP 42 sets up a voice/video call and RTP sessions with the PDA 10 via the AP 20, and transmits a response message in response to the response signal from the PDA 10 as the call terminal to the PDA 53 as the call-receiving terminal in S107.

The AP 42 sets up the voice/video call and RTP sessions with the PDA 53 as the calling terminal in S109, and then registers the terminal information of the PDA 53 corresponding to the RTP session table as shown in FIG. 3 in S109. The terminal information can include the port number information of the gateway or the AP 42, the calling terminal address information, the terminal port number and so on.

If the RTP sessions are set between the calling terminal or PDA 53 and the PDA 10 as the receiving terminal, a determination is made as to whether traffic has been received from the PDA 53 as the call terminal in S110.

If traffic has been received from the calling terminal or PDA 53, the RTP port number of the receiving terminal 10 is extracted in S111, and the voice/video traffic from the calling terminal or PDA 53 is transmitted according to the extracted RTP port number and the address of the receiving terminal 10 in S112. Then, in S113, the PDA 53 as the calling terminal performs video communication with the PDA 10 as the receiving terminal.

If the received call is a incoming call from the AP20 via the Internet 30 in S101 in FIG. 5A, a determination is made as to whether a receiving or destination terminal of the incoming call exists in S102 in FIG. 5B. The calling terminal will be assumed to be the PDA 10 and the receiving or destination terminal will be assumed to be the PDA 53.

If it is determined that the PDA 53 as the destination terminal is not registered in the gateway 40 or the AP 42, the AP 42 generates an error message of "no receiver", and transmits the error message to the AP 20, in which the PDA 10 as the calling terminal is registered, via the Internet 30. Then, the AP 20 transmits the received error message to the PDA 10 as the calling terminal in S103.

On the contrary, if it is determined that the PDA 53 as the destination terminal is registered in the AP 42, the AP 42 determines whether a call forwarding request from the PDA 53 is registered. In other words, a determination is made as to whether a call forwarding mode has been set for a corresponding terminal or the PDA 53 in S114.

If the call forwarding mode has not been set, a determination is made as to whether a call-receiving refusal mode has been set in the AP 42 in response to the request from the PDA 53 in S115.

If the call receiving refusal mode has not been set, a determination is made as to whether a call pickup message has been received from any terminal (for example, 51 or 52) in S116.

If the call pickup message has not been received, the AP 42 waits for a voice/video call and RTP session setup with the PDA 10 as the calling terminal in S117. In S118, the AP 42 generates and transmits a new call message to the PDA 53 as the destination terminal, and then waits for a response from the PDA 53. A call pickup operation when the call pickup message is received from any terminal (for example, 51 or 52) in S116 will be described later.

If a response message has been received from the PDA 53 as the destination terminal in S119, the AP 42 sets up a voice/video call and RTP sessions with the PDA 53 as the destination terminal in S 120, and sets up a call and RTP sessions with the PDA 10 as the calling terminal via the AP 20 in S121.

In S122, the AP 42 registers a traffic flow RTP port number, terminal IP address and terminal RTP port number in its RTP session table as shown in FIG. 3.

If traffic is flowing from the calling terminal or the destination terminal via the set RTP session in S123, the RTP port number is extracted from the traffic in S124, and the traffic is transmitted to the destination terminal or the calling terminal according to the RTP port number and the terminal IP address with the extracted RTP port number as an index in S125. Then, the calling terminal performs video communication with the destination terminal in S126.

The PDA 10 shown in FIG.1 transmits traffic to the PDA 53, via the AP 20 and the AP 42, using data formats that are described in brief as follows: The PDA 10 transmits the port number information of the AP 20, the IP address information of the AP 20 and the actual data (i.e., traffic) to the PDA 53 via the AP 20 and the AP 42. The AP 20 converts the data from the PDA 10 into the port number information of the gateway 40, the address information of APs (including the AP 20) connected to the gateway 40 and corresponding traffic, and transmits the converted data to the gateway 40 via the Internet.

The gateway 40 extracts the RTP port number of the PDA 53 as a corresponding destination terminal from the data transmitted from the AP 20 via the Internet, and then transmits data including the extracted RTP port number, the IP address of a corresponding terminal and a corresponding traffic to the PDA 53.

Hereinafter, a voice/video call pickup method of the invention utilizing the voice/video communication method via the IP-based voice/video communication system will be described in detail with reference to FIGS. 6A and 6B, in which a call pickup process will be executed by the AP 42 of the gateway 40 shown in FIG. 1. However, it will be apparent to those skilled in the art that the AP 20 in FIG. 1 can execute the call pickup process in the same fashion. Also, the call pickup process will be described on the assumption that the PDA 10 shown in FIG. 1 is a calling terminal, the PDA 53 is a terminal in communication with the PDA 10 or a terminal that requested a call receiving from the PDA 10, and the home pad 52 is a terminal that requested call pickup.

Figure 6A:
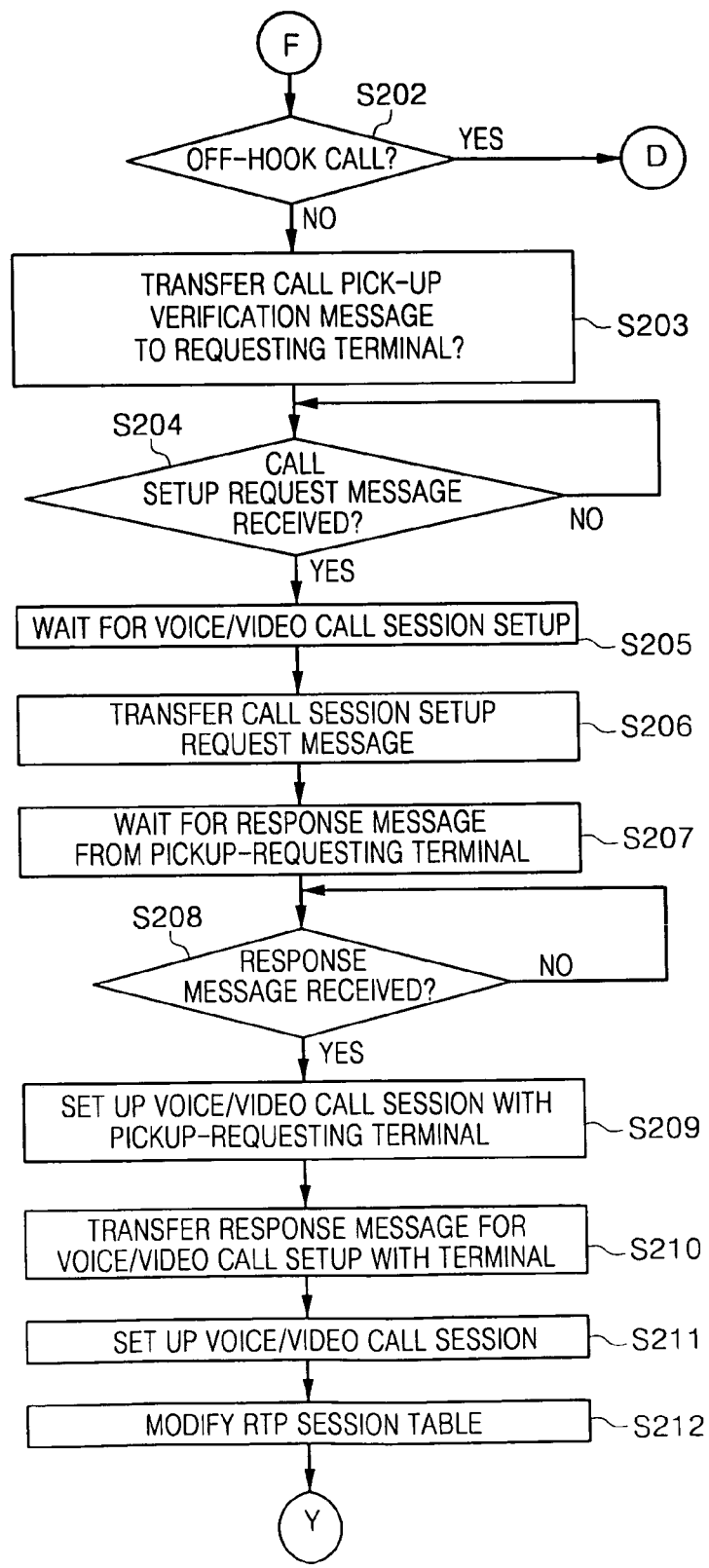

FIG. 6A is a flowchart of the IP-based voice/video call pickup process according to an embodiment of the present invention, by which a incoming call of a receiving terminal is routed to another terminal when the receiving terminal is in a ringing state rather than in a communication mode with the calling terminal.

When an incoming call is received by the AP 42 of the gateway 40 (FIG. 1), if a call pickup message has been received from the home pad 52 (FIG. 1) in S116 in FIG. 5B, a determination is made as to whether the PDA 10 as the calling terminal is in communication or off the hook at present with the receiving terminal PDA 53 requested for call-receiving from the PDA 10 in S202 in FIG. 6A.

If the PDAs 10 and 53 are in communication or off the hook, the off-hook call is supposed to be picked up toward the home pad 52, in which an off-hook call pickup process will be described later.

In S202, if the PDAs 10 and 53 are not in communication or on-hook, the AP 42 transmits a call pickup verification message to the home pad 52 which requested the call pickup in S203.

After transmitting the call pickup message to the home pad 52, if a call setup request message has been received from the home pad 52 in S204, the AP 42 waits for voice/video call session setup with the PDA 10 or the (voice/video) call originator in S205.

While waiting for the voice/video call session setup with the PDA 10, the AP 42 transmits a call session setup request message to the home pad 52 which requested call pickup in S206, and waits for a response message from the home pad 52 in response to the call session setup request message in S207.

If a response message such as a hang-on message in response to the call session setup request message is received from the home pad 52 in S208, the AP 42 sets up a voice/video call session with the home pad 52 in S209, and transmits a voice/video call session setup response message to the PDA 10 as the voice/video call terminal in S210, so that the voice/video call session is set up between the PDA 10 and the AP 42 in S211.

Then, as the voice/video call session is set up between the home pad 52, which requested call pickup, and the PDA 10 as the calling terminal, an RTP session table as shown in FIG. 3 is modified in S212. That is, the port number of the call pickup-requesting terminal is registered in the last field of the table.

If voice/video data (e.g., traffic) is received from the PDA 10 as the call terminal in S222, then the AP 42 extracts the RTP port number from the corresponding data in S223, and acquires the IP address and the port number of a call pickup destination terminal corresponding to the extracted RTP port number in S224 and S225. That is, if the traffic is received from the PDA 10 as the calling terminal, the AP 42 extracts the gateway (AP) port number from the received traffic, and determines if the port number of the call pickup destination terminal is registered as the extracted AP port number in the RTP session table. If the port number of the call pickup destination terminal is registered in the last field of the RTP table, the AP 42 extracts a gateway port number corresponding to the port number of the corresponding call pickup forwarding destination terminal, and acquires the address of a terminal matching the corresponding gateway port number or the IP address of the call pickup destination terminal.

Upon acquiring the port number and the IP address of the call pickup destination terminal, the AP 42 transmits the receiving voice/video traffic according to the port number and IP address acquired above in S225. Then, the PDA 10 as the calling terminal performs video communication with the home pad 52 as the call pickup destination terminal in S226.

As a result, although the calling terminal requested the voice/video call to the PDA 53, the AP 42 does not transmit the received voice/video traffic to the PDA 53 but to the home pad 52, which requested the call pickup, according to the call pickup request toward the home pad 52 made by the user.

Although the foregoing call pickup operation toward the home pad 52 has been described on the assumption that the PDA 53 is ringing rather than that the PDA 10 as the calling terminal is in communication with the PDA 53 as the receiving terminal, hereinafter a call pickup operation of an off-hook voice/video call toward the home pad 52 will be described on the assumption that the PDA 10 is in communication with the PDA 53.

FIG. 6B is a flowchart of the IP-based voice/video call pickup process according to an embodiment of the present invention, in which a call pickup operation is executed toward a terminal (e.g., the home pad 52) while a calling terminal (e.g., the PDA 10) is in voice/video communication with a receiving terminal (e.g., the PDA 53).

If the PDA 10 as the calling terminal is in communication with the PDA 53 as the receiving terminal in S202 in FIG. 6A, then the AP 42 determines whether a call pickup refusal mode is set for the home pad 52, which requested call pickup, in S213 in FIG. 6B.

If the call pickup refusal mode has been set, the AP 42 transmits a call pickup refusal error message to the home pad 52, which requested call pickup, in S214.

On the contrary, if the call pickup refusal mode has not been set to the home pad 52, the AP 42 transmits a confirmation request message for call pickup to the home pad 52, and then waits for a calling message from the home pad 52 as the call pickup/forwarding destination terminal in S215.

If a calling message is received from the home pad 52, the AP 42 of the gateway 40 transmits a response message such as a hang-on message to the home pad 52 in S217, and sets up voice/video call and RTP sessions with the home pad 52 as the call pickup forwarding destination terminal in S218.

As the voice/video call and RTP sessions are set up with the home pad 52, the AP 42 transmits a voice/video call cancel request message to the PDA 53 or the previous terminal in communication at present, and receives a response message in response to the call cancel request message from the PDA 53 in S219. Upon receiving the response message from the PDA 53, the AP 42 cancels the voice/video call session with the PDA 53 in S220.

After canceling the voice/video call session with the PDA 53, which is a previous terminal in communication, the AP 42 modifies the registration of its RTP session table as shown in FIG. 3 in S221. That is, the AP 42 registers the port number of the call pickup destination terminal in the last field of the table.

If voice/video data (e.g., a traffic) is received from the PDA 10 as the calling terminal in S222, the AP 42 extracts the RTP port number from the corresponding data in S223, and acquires the port number and the IP address of the call pickup forwarding destination terminal corresponding to the extracted RTP port number in S224. That is, if the traffic as shown in FIG. 3 is received from the PDA 10 as the calling terminal, the AP 42 extracts the gateway (AP) port number from the received traffic, and determines if the port number of the call pickup destination terminal is registered as the extracted AP port number in the RTP session table. If the port number of the call pickup destination terminal is registered in the last field of the RTP table, then the AP 42 extracts a gateway port number corresponding to the port number of the corresponding call pickup forwarding destination terminal, and acquires the address of a terminal matching the corresponding gateway port number or the IP address of the call pickup destination terminal.

Upon acquiring the port number and the IP address of the call pickup destination terminal, the AP 42 transmits the receiving voice/video traffic according the port number and the IP address (of the home pad as the call pickup destination terminal) acquired above in S225. Then, the PDA 10 as the calling terminal performs video communication with the home pad 52 as the call pickup destination terminal in S226.

Hereinafter a call forwarding process using an IP-based voice/video communication system according to an embodiment of the present invention will be described below with reference to FIGS. 7A and 7B. In describing the call forwarding process, the PDA 10 shown in FIG. 1 will be assumed to be a calling terminal, the PDA 53 will be assumed to be a call forwarding terminal and the home pad 52 will be assumed to be a call forwarding destination terminal.

Figure 7A:
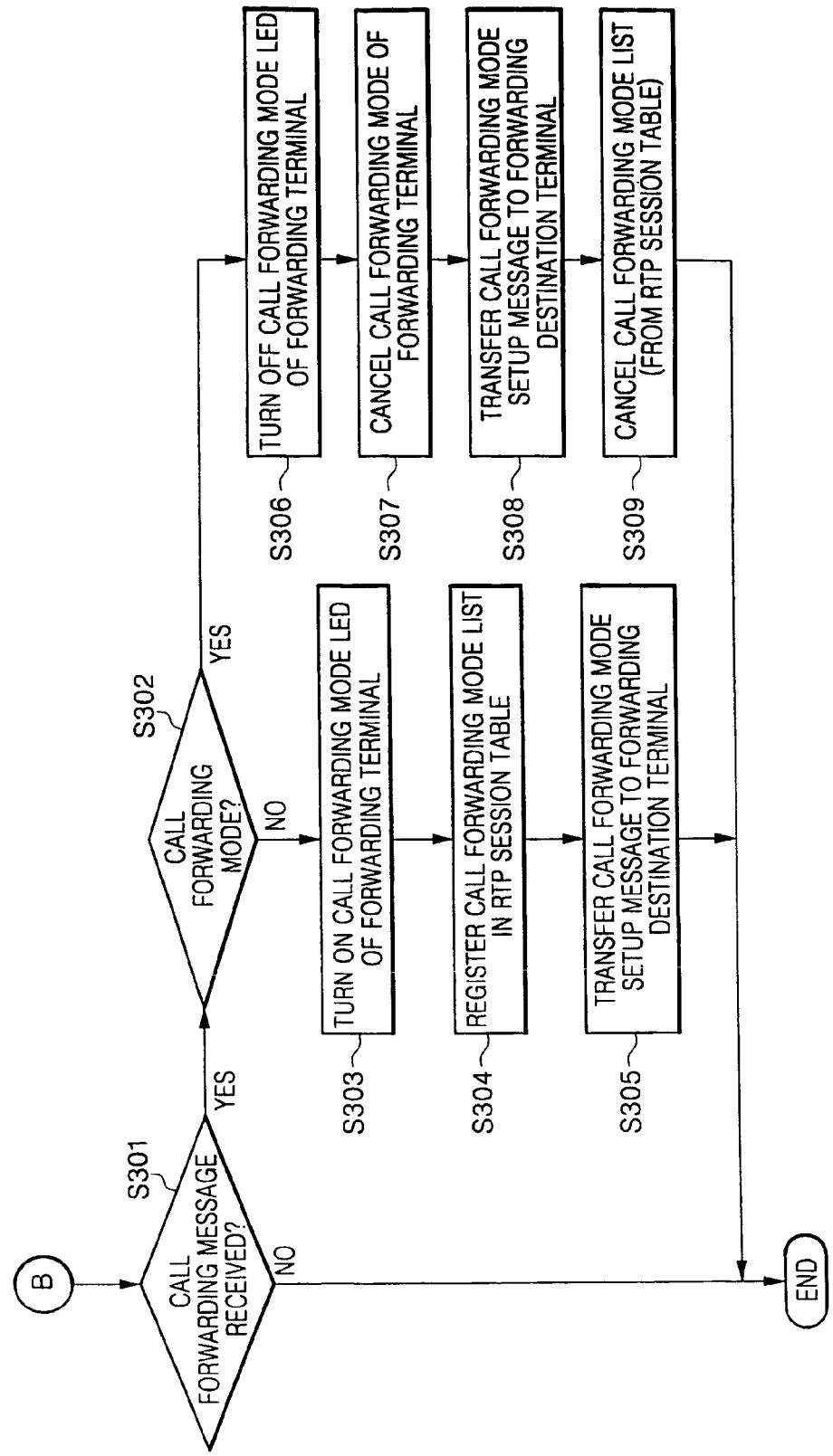

FIGS. 7A and 7B are flowcharts of IP-based voice/video call forwarding processes according to an embodiment of the present invention, in which FIG. 7A is a process flowchart with respect to call forwarding mode setup, and FIG. 7B is a process flowchart with respect to a call controlling flow when the call forwarding mode is set up.

As shown in FIG. 7A, if the received signal is not an incoming signal or a call signal in S101 and S104 in FIG. 5A, the AP 42 determines whether a call forwarding request message has been received from any terminal in S301. The call forwarding request message can include the terminal information of the call forwarding destination terminal, that is, the home pad 52, as above, is assumed to be the call forwarding destination terminal and the service type information is assumed to be of, for example, a voice service, video service or voice/video service.

If the call forwarding request message has been received from the PDA 53, the AP 42 determines if a call forwarding mode has been previously set up from the PDA 53 in S302.

If the call forwarding mode has not been set up from the PDA 53, the AP 42 transmits a response message informing the possibility of the call forwarding mode to the PDA 53, which requested the call forwarding, to turn on a display (e.g., an LED) for indicating that the call forwarding mode has ben set up in S303.

Then, the AP 42 registers the IP address and port information of the call forwarding terminal (or the PDA), the IP address and port information of the terminal subject to call forwarding (or the home pad) and the service type information of the call to be forwarded in its call forwarding table as shown in FIG. 4 in S304.

If the call forwarding list information has been registered in the call forwarding table, then the AP 42 transmits a call forwarding setup message toward the home pad 53 as the forwarding destination terminal to complete the call forwarding mode setup in S305.

If it has been determined that the call forwarding mode from the PDA 53 to the home pad 52 has already been set in S302, a message indicating that the call forwarding mode has already been set is transmitted to the PDA 53 as the call forwarding terminal, to turn off the LED attached to the PDA 53 in S306, and the previously set call forwarding mode is disabled via the PDA 53 in S307.

The AP 42 transmits a call forwarding mode cancel message to the home pad 52 that has been set as the call forwarding destination terminal in S308, and then cancels the list information of the call forwarding terminal registered in the call forwarding table as shown in FIG. 4 in S309.

Although the above embodiment has been described with respect to the call forwarding mode setup and cancel operation being performed using toggle keys installed in the respective terminals 51, 52 and 53 shown in FIG. 1, (that is, the call forwarding mode of each of the terminals 51, 52 and 53 is set by selecting a toggle key and canceled by pressing the corresponding key again), it is to be understood by those skilled in the art that each terminal can be provided with a call forwarding mode setup key together with a separate call forwarding mode cancel key so that the call forwarding mode setup and cancel operation for the each terminal can be performed with the setup and cancel keys.

Hereinafter a video communication operation in the call forwarding mode set as above will be described with reference to FIG. 7B.

As shown in FIG. 7B, if it has been determined that the call forwarding mode is set as in FIG. 7A or in S114 in FIG. 5B, the AP 42 waits for the voice/video call session setup with the PDA 10 (as shown in FIG. 1) assumed above as the calling terminal in S401. Then, in S402, the AP 42 generates and transmits a call session setup request message to the home pad 52 as the forwarding termination terminal which is set in the call forwarding mode, and waits for a response message from the home pad 52.

If the response message such as a hang-on message is received from the home pad 52 in S403, the AP 42 sets up voice/video call and RTP sessions with the home pad 52 in S404, and sets up voice/video call and RTP sessions with the PDA 10 as the calling terminal via the AP 20 in S405 and S406.

If traffic is received from the PDA 10 as the calling terminal through the RTP session set as above in S407, the port number of the AP 42 is extracted from the received traffic in S408, and the port number and the IP address of the home pad 52 forwarding destination terminal with respect to the extracted port number of the AP 42 are extracted from the call forwarding table as shown in FIG. 4 in S409.

Upon acquiring the port number and the IP address of the home pad 52 as the call forwarding destination terminal, the received voice/video traffic is transmitted according to the acquired port number and the IP address in S410, so that video communication can be performed between the PDA 10 as the calling terminal and the home pad 52 as the call forwarding destination terminal in S411.

While the above embodiments of the call forwarding method have been described in conjunction with the call forwarding operations to a single terminal, priorities can be imparted to a plurality of call forwarding registered terminals so that the AP 42 can execute call forwarding according to the priorities. It will be apparent to those skilled in the art that call forwarding can be executed to a second priority terminal in the absence of a first priority terminal.

If the call forwarding mode is set to multiple terminals (i.e., a plurality of terminals), then the call forwarding table shown in FIG. 4 can further contain a field for registering the priority information of call forwarding terminals and a field for registering the information of the terminals to which call forwarding is set according to the priority, that is, the port and IP information of the terminals according to the priority.

Further, although the above embodiments have been described only in conjunction with the call forwarding and pickup operations between terminals, the call pickup/forwarding operations can be executed between gateways or APs. This can be enabled by the APs sharing the information of registered terminals and the position information of the terminals.

According to the IP based voice/video communication system and the call pickup/forwarding method of the present invention, during video communication via the video communication terminal or upon receiving a new video call, a subscriber can execute call forwarding by selecting a specific key in a video communication terminal such as a TV, PDA and home pad to pick up a call to a desired terminal.

Furthermore, call forwarding can be set from a specific terminal to a desired terminal when the subscriber moves through a living room, a bedroom and a kitchen at home or works at the office so that the subscriber can receive voice/video calls received in the specific terminal irrespective of the subscriber's location.

For example, if a call pickup key on the PDA/home pad is selected during video communication via the TV, a video signal which is being transmitted to the TV via a set-top box is transmitted to the PDA/home pad so that video communication can be continuously performed via the PDA.

Furthermore, because video communication cannot be executed via the TV if another person wants to watch the TV while video communication is executed via the TV, call forwarding is executed to a terminal designated by the subscriber to continue video communication.

According to the IP based voice/video communication system and the call pickup/forwarding method of the present invention, as set forth above, a subscriber can have video communication irrespective of time or place by forwarding video calls between video communication terminals such as a TV, PDA and home pad, or by picking up a incoming call at a nearby terminal if it is difficult for the subscriber to answer the call from his/her location.

What is claimed is:

1. A call pickup/forwarding method comprising:
   determining whether a first terminal is in voice/video communication with a second terminal upon receiving a call signal for call setup to the second terminal from the first terminal via a first network and upon receiving a request signal for pickup of a call received to the second terminal from a third terminal;
   setting a call session with each of the first and third terminals and registering a call pickup information of the third terminal in a call pickup table upon a determination that the first terminal is not in voice/video communication with the second terminal;
   setting a call session with the third terminal which made the call pickup request, canceling a call session with the second terminal in voice/video communication, and then registering the call pickup information of the third terminal in the call pickup table upon a determination that the first terminal is in voice/video communication with the second terminals; and
   transmitting received voice/video traffic to the third terminal which made the call pickup request via a second network based upon the call pickup information registered in the call pickup table upon receiving voice/video traffic from the first terminal via the first network,
   wherein said transmission of received voice/video traffic to said third terminal occurs regardless of the proximity of the first terminal to the third terminal and any terminal that is located closer to the first terminal in said first network.

2. The method according to claim 1, wherein the first network comprises an Internet Protocol (IP) network, and the second network comprises a Wireless Local Area Network (WLAN).

3. The method according to claim 1, wherein each of the terminals comprises at least one terminal selected from a group including a TV, a Personal Digital Assistant (PDA) and a home pad, each of which can perform video and voice communication via the first and second networks.

4. The method according to claim 1, wherein the call pickup table comprises:
   a first field adapted to store a port number of at least one terminal registered in a gateway or Access Point (AP);
   a second field adapted to store an IP address of at least one terminal registered in the AP;
   a third field adapted to store a port number of each terminal; and
   a fourth field adapted to store port number information of the terminal which made the call pickup request.

5. The method according to claim 4, wherein the port number information of the terminal which made the call pickup request registered in the fourth field corresponds to at least one port number of gateways stored in the first field, and wherein a call is forwarded to an IP address corresponding to the gateway port number corresponding to the port number information stored in the fourth field upon the port number of the terminal which made the call pickup request being registered in the fourth field.

6. The method according to claim 1, wherein transmitting received voice/video traffic to the third terminal comprises:
   extracting Real-time Transport Protocol (RTP) port number information from the received voice/video traffic upon receiving voice/video traffic to be transmitted to the second terminal via the first network from the first terminal;
   acquiring a port number and IP address information of the third terminal which made the call pickup request corresponding to the extracted RTP port number; and
   transmitting the received voice/video traffic to the third terminal via the second network using the port number and IP address information of the third terminal which made the call pickup request.

7. The method according to claim 1, further comprising transmitting a call pickup refusal error message to the third terminal via the second network upon a call pickup refusal mode being set with respect to the third terminal during the voice/video communication between the first and second terminals.

8. A call pickup/forwarding method comprising:
   registering call forwarding information of a first terminal which requested a call forwarding setup and a second terminal to be call forwarded in a call forwarding table upon receiving a voice/video call forwarding mode setup request message to the second terminal from the first terminal via a first network;
   setting up a call session with the second terminal upon incoming voice/video traffic being received from a third terminal via a second network; and
   transmitting the received voice/video traffic to the second terminal via the second network using the call forwarding information registered in the call forwarding table upon voice/video traffic being received from the third terminal,
   wherein said transmission of voice/video traffic to said second terminal occurs regardless of the proximity of the first terminal to the second terminal and any terminal that is located closer to the first terminal in said first network.

9. The method according to claim 8, wherein the first network comprises a WLAN, and the second network comprises an IP network.

10. The method according to claim 8, wherein each of the terminals comprises at least one terminal selected from a group including a TV, a PDA and a home pad, each of which can perform video and voice communication via the first and second networks.

11. The method according to claim 8, wherein the call forwarding information stored in the call forwarding table comprises at least one piece of information selected from a group including IP address information of the terminal which requested the call forwarding, and an IP address and port number information of service which will be provided between the terminals.

12. The method according to claim 8, further comprising transmitting a call forwarding mode cancel message to the second terminal via the first network, and then canceling the call forwarding information registered in the call forwarding table upon a call forwarding cancel request message being received from the first terminal during the setup of the call forwarding mode from the first terminal to the second terminal.

13. The method according to claim 8, wherein transmitting received voice/video traffic to the third terminal comprises:
   extracting RTP port number information from the received voice/video traffic upon receiving voice/video traffic to be transmitted to the second terminal via the first network from the third terminal;
   acquiring a port number and IP address information of the third terminal which made the call pickup request corresponding to the extracted RTP port number; and transmitting the received voice/video traffic to the second terminal via the first network using the port number and IP address information of the third terminal which made the call pickup request.

14. A call pickup/forwarding system comprising:
a judgment unit adapted to determine whether a first terminal is in voice/video communication with a second terminal upon receiving an incoming signal for call setup to the second terminal from the first terminal via a first network and upon receiving a request signal for the pickup of a call received in the second terminal from the third terminal;
a storage unit adapted to store call pickup information upon a call pickup request from the third terminal;
a session setup unit adapted to set up call sessions with the first terminal and the third terminal and to store call pickup information of the third terminal in the storage unit upon a determination that the first terminal is not in voice/video communication with the second terminal, and adapted to set up a call session with the third terminal which made the call pickup request canceling the call session with the second terminal which is in voice/video communication with the first terminal, and then to store call pickup information of the third terminal in the storage unit; and
a call pickup processing unit adapted to transmit received voice/video traffic to the third terminal which made the call pickup request via a second network using the call pickup information stored in the storage unit upon receiving voice/video traffic via the first network from the first terminal according to the call session setup of the session setup unit,
wherein transmission of voice /video communication to said third terminal occurs regardless of the proximity of the first terminal to the third terminal and any terminal that is located closer to the first terminal in said first network.

15. The system according to claim 14, wherein the storage unit comprises:
a first field adapted to store a port number of at least one terminal registered in a gateway or AP;
a second field adapted to store an IP address of at least one terminal registered in the AP;
a third field adapted to store a port number of each terminal; and
a fourth field adapted to store port number information of the terminal which made the call pickup request.

16. The system according to claim 14, wherein the call pickup processing unit comprises:
an extraction unit adapted to extract RTP port number information from the voice/video traffic to be transmitted to the second terminal, and adapted to extract a port number and IP address information of the third terminal which made the call pickup request corresponding to the extracted RTP port number; and
a transmit unit adapted to transmit the received voice/video traffic to the third terminal via the second network using the port number and IP address information of the third terminal which made the call pickup request.

17. A call pickup/forwarding system comprising:
a storage unit adapted to store call forwarding information of terminals for forwarding received voice/video calls;
a call forwarding mode setup unit adapted to register call forwarding information of a first terminal and a second terminal in the storage unit to set up a call forwarding mode upon receiving a voice/video call forwarding mode setup request message to the second terminal from the first terminal via a first network;
a call session setup unit adapted to set up a call session with the second terminal to be call forwarded upon receiving an incoming signal from a third terminal via a second network; and
a call forwarding processing unit adapted to transmit voice/video traffic to the second terminal via the second network using the call forwarding information of the second terminal registered in the storage unit upon receiving the voice/video traffic from the third terminal,
wherein said transmission of voice /video traffic to said second terminal occurs regardless of the proximity of the first terminal to the second terminal and any terminal that is located closer to the first terminal in said first network.

18. The system according to claim 17, wherein the first network comprises a WLAN, and the second network comprises an IP network.

19. The system according to claim 17, wherein the call forwarding information stored in the storage unit comprises at least one piece of information selected from a group including an IP address and port number information of the terminal which made a call forwarding request, and an IP address and port number information of the second terminal and service type information of services which will be provided between the terminals.

20. The system according to claim 17, wherein the call forwarding mode setup unit is adapted to transmit a call forwarding mode cancel message to the second terminal via the first network, and to then cancel the call forwarding information registered in the storage unit upon receiving a call forwarding cancel request message from the first terminal at the setup of the call forwarding mode from the first terminal to the second terminal.

21. The system according to claim 17, wherein the call forwarding processing unit comprises:
an extraction unit adapted to extract RTP port number information from the voice/video traffic to be transmitted to the first terminal and adapted to extract a port number and IP address information of the second terminal corresponding to the extracted RTP port number; and
a transmit unit adapted to transmit the received voice/video traffic to the second terminal via the first network using the port number and IP address information of the second terminal which made the call forwarding request.

* * * * *

UNITED STATES PATENT AND TRADEMARK OFFICE
CERTIFICATE OF CORRECTION

PATENT NO. : 7,656,889 B2                                            Page 1 of 1
APPLICATION NO. : 10/987119
DATED : February 2, 2010
INVENTOR(S) : Jeon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1447 days.

Signed and Sealed this

Twenty-eighth Day of December, 2010

David J. Kappos
*Director of the United States Patent and Trademark Office*